US012309889B2

(12) United States Patent
Asakura et al.

(10) Patent No.: US 12,309,889 B2
(45) Date of Patent: May 20, 2025

(54) SHEET HEATER

(71) Applicant: Tachibana-Technos Co., Ltd., Osaka (JP)

(72) Inventors: Masahiro Asakura, Osaka (JP); Toshiyuki Nishino, Osaka (JP)

(73) Assignee: Tachibana-Technos Co., Ltd., Osaka (JP)

( * ) Notice: Subject to any disclaimer, the term of this patent is extended or adjusted under 35 U.S.C. 154(b) by 0 days.

(21) Appl. No.: 18/834,539

(22) PCT Filed: Dec. 9, 2022

(86) PCT No.: PCT/JP2022/045420
§ 371 (c)(1),
(2) Date: Jul. 30, 2024

(87) PCT Pub. No.: WO2024/122046
PCT Pub. Date: Jun. 13, 2024

(65) Prior Publication Data

US 2025/0113410 A1 Apr. 3, 2025

(51) Int. Cl.
*H05B 3/26* (2006.01)

(52) U.S. Cl.
CPC ....... *H05B 3/267* (2013.01); *H05B 2203/029* (2013.01)

(58) Field of Classification Search
CPC ................ H05B 2203/029; H05B 3/34; H05B 2203/003; H05B 2203/009; H05B 2203/011; H05B 2203/014; H05B 2203/017; H05B 3/20; H05B 3/26; H05B 3/262; H05B 3/265; H05B 3/267; H05B 3/28; H05B 3/283; H05B 3/286; H05B 3/342; H05B 3/345; H05B 3/347; H05B 3/36; H05B 3/40; H05B 3/54; H05B 3/56; H05B 3/845; A47C 7/748; B60N 2/5685

(Continued)

(56) References Cited

U.S. PATENT DOCUMENTS 4,988,558 A * 1/1991 Shigemoto .............. B32B 27/08
525/240
6,180,719 B1 * 1/2001 Miyata ................. C08G 59/027
525/108

(Continued)

FOREIGN PATENT DOCUMENTS

CN 103202093 A 7/2013
JP 02-061977 A 3/1990

(Continued)

OTHER PUBLICATIONS

Office Action dated Nov. 30, 2024 in CN202280090686.0, which is the Chinese counterpart patent application of the subject U.S. patent application.

*Primary Examiner* — Sang Y Paik
(74) *Attorney, Agent, or Firm* — Wood, Phillips, Katz, Clark & Mortimer

(57) ABSTRACT

A sheet heater (10) includes: a heat-insulating base material (1); a metal-coated base material (3) arranged on the heat-insulating base material; a cord-like heating element (5) arranged on a side closer to the metal-coated base material with respect to the heat-insulating base material; and a black thermal fusion layer (4) arranged adjacent to the cord-like heating element.

17 Claims, 4 Drawing Sheets

(58) Field of Classification Search
USPC .......................................................... 219/209
See application file for complete search history.

(56) References Cited

U.S. PATENT DOCUMENTS

| | | | | |
|---|---|---|---|---|
| 2003/0047549 | A1* | 3/2003 | Horey .................... | H05B 3/342 219/529 |
| 2005/0040158 | A1 | 2/2005 | Bamy Bamy et al. | |
| 2010/0224612 | A1 | 9/2010 | Asami et al. | |
| 2013/0220994 | A1 | 8/2013 | Hanada et al. | |

FOREIGN PATENT DOCUMENTS

| | | | |
|---|---|---|---|
| JP | 03-286854 | A | 12/1991 |
| JP | 11-084927 | A | 3/1999 |
| JP | 2005-520315 | A | 7/2005 |
| JP | 2007-200866 | A | 8/2007 |
| JP | 2008-258129 | A | 10/2008 |
| JP | 2014-127230 | A | 7/2014 |

* cited by examiner

SHEET HEATER

FIELD OF THE INVENTION

The present invention relates to a sheet heater.

BACKGROUND OF THE INVENTION

In general, sheet heaters obtained by fixing cord-like heating elements to various base materials have been known. Such sheet heater has been used in, for example, a seat heater for an automobile. One form of such sheet heater has a structure in which a cord-like heating element is arranged on a heat-insulating base material made of, for example, a nonwoven fabric or a urethane foam in a meandering manner, and is sewed to the base material. In addition, another form of the sheet heater has a structure in which a cord-like heating element having a thermal fusion layer arranged on its surface is arranged on a base material having another thermal fusion layer arranged on its surface in a meandering manner, and is fused and fixed to the base material by heat-pressure bonding. An example of such sheet heater is disclosed in, for example, JP 2014-127230 A. When such sheet heater is used as a seat heater, the sheet heater is arranged, for example, between a heat-insulating seat cushion and an outer cover. Such sheet heater has been required to have various kinds of performance, such as bending durability, a quick warming property, heating uniformity, an energy-saving property, and contact sensibility, in accordance with its applications.

BRIEF SUMMARY OF THE INVENTION

An object of the present invention is to provide an excellent sheet heater.

According to one aspect of the present invention, there is provided a sheet heater, including: a heat-insulating base material; a metal-coated base material arranged on the heat-insulating base material; a cord-like heating element, which is an elongate heating element that is also referred to hereinafter as a cord heating element, arranged on a side closer to the metal-coated base material with respect to the heat-insulating base material; and a black thermal fusion layer arranged adjacent to the cord-like heating element.

According to the present invention, the excellent sheet heater can be provided.

DETAILED DESCRIPTION OF THE PREFERRED EMBODIMENTS

An embodiment is described with reference to the drawings. This embodiment relates to a sheet heater that may be used as, for example, a seat heater. The sheet heater of this embodiment has the advantages of various plane heating elements while using a cord-like heating element that has served as a seat heater to achieve reliability and economic efficiency for long years. The sheet heater of this embodiment is excellent in energy-saving characteristic.

[Sewed Sheet Heater]

[Outline of Structure]

Figure 1A:
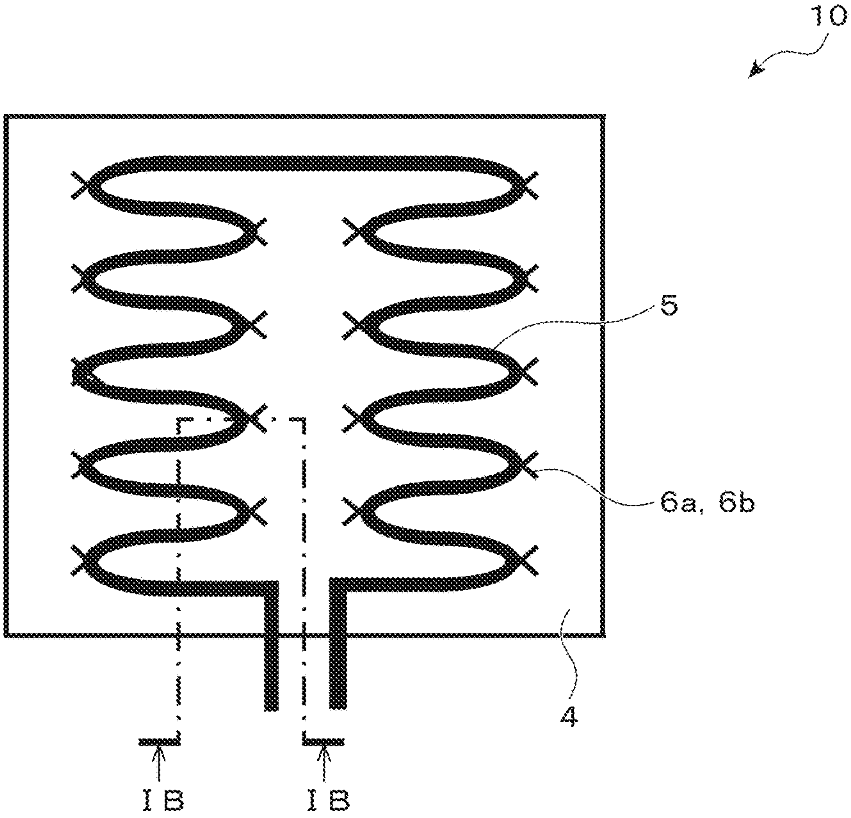
FIG. 1A is a schematic plan view for illustrating the outline of an example of the configuration of a sewed sheet heater according to a first embodiment.
Figure 1B:
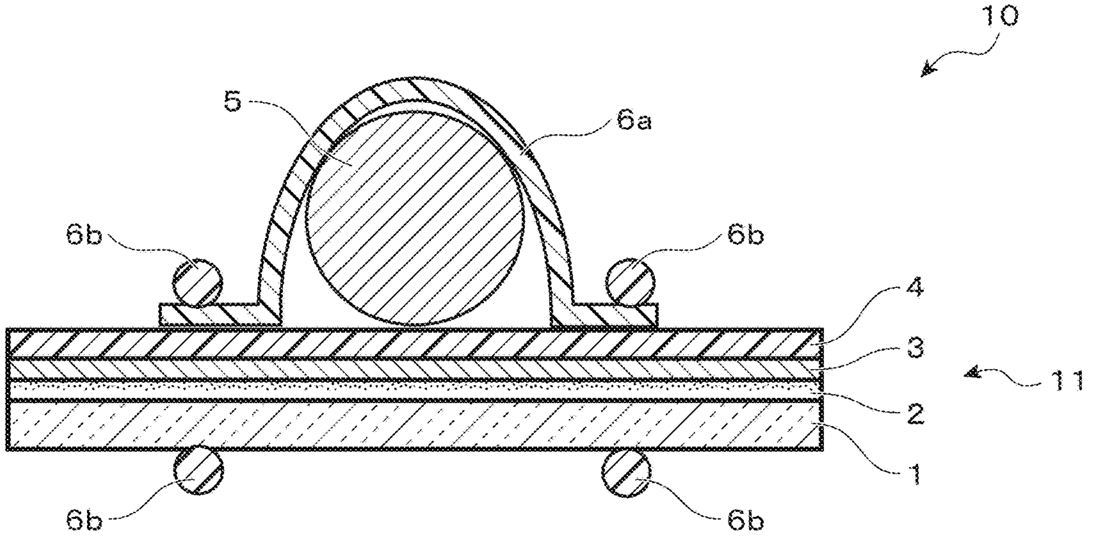
FIG. 1B is a view for schematically illustrating the outline of a cross-section of the sewed sheet heater along the line IB-IB illustrated in FIG. 1A.

A first embodiment relates to a sewed sheet heater. FIG. 1A is a schematic plan view for illustrating the outline of an example of the configuration of a sheet heater 10 according to this embodiment. FIG. 1B is a schematic sectional view for illustrating the outline of a cross-section of the sheet heater 10 along the line IB-IB illustrated in FIG. 1A.

The sheet heater 10 has a structure in which a cord-like heating element 5 is fixed onto a base material 11 for holding a heating cord. The base material 11 for holding a heating cord has a structure in which a heat-insulating base material 1, an adhesive layer 2, an aluminum-coated base material 3, and a black thermal fusion layer 4 are sequentially laminated. The base material 11 for holding a heating cord is formed by: integrating the heat-insulating base material 1 and the aluminum-coated base material 3 with each other with an adhesive; then arranging the black thermal fusion layer 4 on the surface of the aluminum-coated base material 3; and thermally fusing the black thermal fusion layer 4 to the surface of the aluminum-coated base material 3 through hot pressing or the like. Alternatively, the heat-insulating base material 1, the adhesive, the aluminum-coated base material 3, and the black thermal fusion layer 4 may be arranged and thermally fused to each other in one stroke. In each case, the aluminum-coated base material 3 is arranged on the heat-insulating base material 1. The black thermal fusion layer 4 is a black thermal fusion layer containing carbon.

The cord-like heating element 5 is fixed onto the black thermal fusion layer 4 of the base material 11 for holding a heating cord. The cord-like heating element 5 is fixed to the base material 11 for holding a heating cord by sewing with an upper thread 6*a* and a lower thread 6*b*. For example, the cord-like heating element 5 is laid on the surface of the black thermal fusion layer 4 of the base material 11 for holding a heating cord in accordance with the pattern program of an automatic sewing machine, and for example, the heating element is sewed in a zigzag manner with the upper thread 6*a* and the lower thread 6*b*. Thus, the cord-like heating element 5 is sewed and fixed to the base material 11 for holding a heating cord. As described above, the black thermal fusion layer 4 is arranged adjacent to the cord-like heating element 5. The strength at which the cord-like heating element 5 is fixed and its looseness may be adjusted by moderately adjusting, for example, a sewing speed, a sewing width, and the tension of each of the threads. When the sheet heater 10 is used as a seat heater, a downward deformation stress due to the seating of a user can be relaxed by a shift caused by the sliding of the cord-like heating element 5. Such structure provides high durability.

[Details about Respective Portions]

Details about the respective portions of the sheet heater 10 are described.

<Heat-Insulating Base Material and Adhesive>

Various materials, such as a urethane foam, a nonwoven fabric, and a felt, may each be used as a material for the heat-insulating base material 1. With regard to the bonding of the heat-insulating base material 1 and the aluminum-coated base material 3, as the flatness of the heat-insulating base material becomes higher, the occurrence of a crease after the bonding is suppressed to a larger extent. Accordingly, the material for the heat-insulating base material 1 is preferably selected from the respective materials while emphasis is placed on surface smoothness.

The adhesive that bonds the heat-insulating base material 1 and the aluminum-coated base material 3 to each other is required to have heat resistance and flame retardance. In addition, when the sheet heater 10 is used as a seat heater, the adhesive is preferably a soft adhesive. When an adhesive that becomes harder after its curing is used, a user is liable to feel discomfort because a seat including the seat heater becomes stiff when the user is seated thereon.

<Aluminum-Coated Base Material>

The aluminum-coated base material 3 is obtained by applying an aluminum thin film to a soft and durable cloth. A woven fabric, a nonwoven fabric, a polymer film, or the like may be used as the cloth. The aluminum thin film is applied by, for example, vacuum deposition, sputtering, or plasma spraying. The vacuum deposition is preferred in terms of heat conduction because aluminum is deposited at an atomic level, and hence the aluminum thin film to be formed becomes dense. The sputtering and the plasma spraying each provide a high lamination speed, and hence the aluminum thin film is deposited fine but in a particulate manner. Accordingly, the vacuum deposition is preferred in terms of heat conduction.

The thickness of the aluminum thin film is from 5 μm to 50 μm, preferably from 10 μm to 15 μm. When the thickness of the thin film is 5 μm or less, the thermal conductivity thereof reduces. When the thickness is 50 μm or more, the aluminum thin film is liable to peel. In addition, the amount of the thin film to be produced per time becomes relatively low, and hence cost therefor increases.

In the case of the vacuum deposition of aluminum, a woven fabric excellent in flatness is preferred as the cloth. When a vegetable fiber and a petrochemical fiber are compared to each other, the vegetable fiber is preferred as a material for the woven fabric. In particular, a cotton woven fabric that is used for general purposes and is inexpensive is preferred. Of the cotton fabrics, a plain weave cloth that is flexible and glossy like a dress shirt is preferred for obtaining a thin aluminum deposited film. A strong stretching force is applied to the petrochemical fiber at the time of its spinning. Accordingly, the cloth shrinks in its longitudinal direction through heating at the time of the operation of a heater, and hence the deformation of the cloth is liable to occur.

The aluminum-coated cotton fabric is commercially available as, for example, a quick heating and uniform heating cover for an ironing board. Such aluminum-coated cotton fabric does not show any shrinkage at high temperatures, and is excellent in thermal conductivity.

In the case where the vacuum deposition of aluminum is performed, when the cloth is a general nonwoven fabric, a portion shaded from an evaporation source increases to make it difficult to form a uniform deposited film. However, along with recent widespread of a nonwoven fabric mask, a technology in which a special process is added to smooth the surface of a nonwoven fabric has been developing, though cost for the fabric becomes higher. Sufficiently uniform aluminum deposition is possible on such surface-smoothed nonwoven fabric. Accordingly, the surface-smoothed nonwoven fabric is also preferred as the cloth. The nonwoven fabric includes petrochemical fibers, the fibers being short and the short fibers being randomly arranged. Accordingly, an influence of the shrinkage of each of the short fibers on the entirety of the fabric is small, and hence the deformation of the cloth hardly occurs.

In addition, as described above, the heat-insulating base material 1 may be a nonwoven fabric. Accordingly, the heat-insulating base material 1, which is made of a general thick and inexpensive nonwoven fabric, and the aluminum-coated base material 3, which is obtained by vapor-depositing aluminum on a nonwoven fabric cloth that is costly but has a smooth surface, may be bonded to each other. In addition, when a nonwoven fabric that is thick and has a smooth surface is supplied at low cost, a product obtained by performing the vacuum deposition of aluminum on the nonwoven fabric that is thick and has a smooth surface may be used instead of the heat-insulating base material 1, the adhesive layer 2, and the aluminum-coated base material 3. That is, the heat-insulating base material and the aluminum-coated base material arranged on the heat-insulating base material may be integrally formed as a nonwoven fabric coated with aluminum on its surface.

In the case where the vacuum deposition of aluminum is performed, when the cloth is a polymer film, problems in terms of adhesive strength against a deformation stress and heat shrinkage are liable to occur.

In addition, the aluminum-coated base material 3 is not limited to the product obtained by applying the aluminum thin film to the cloth. The aluminum-coated base material 3 may be, for example, a woven fabric formed from an aluminum-coated long fiber.

In addition, the aluminum-coated base material 3 may be any other metal-coated base material containing any other appropriate metal instead of aluminum. For example, silver or copper may be used instead of aluminum.

<Black Thermal Fusion Layer>

The black thermal fusion layer 4 of this embodiment is obtained by: kneading a polyolefin-based resin, carbon particles, and a trace amount of an additive; and forming the kneaded product into a film shape with a biaxial stretching apparatus. Ceramic powder may be used instead of the carbon particles or in addition to the carbon particles. The black thermal fusion layer 4 has a heat-fusing function. The black thermal fusion layer 4 prevents the peeling of the aluminum thin film of the aluminum-coated base material 3 to impart safety to the sheet heater 10. In addition, the black thermal fusion layer 4 imparts a far-infrared ray-radiating function to the sheet heater 10. The far-infrared ray-radiating function enables the sheet heater 10 to heat a heating object with a heat ray of far-infrared ray as well as to heat the heating object through heat conduction. As a result, the thermal efficiency of the sheet heater 10 is improved, and hence an energy-saving effect is obtained.

A polyolefin resin and an olefin-based copolymer may be used alone or in combination thereof as the polyolefin-based resin. For example, polyethylene, polypropylene, or polybutene may be used as the polyolefin resin. The polyethylene comprehends, for example, high-density polyethylene, low-density polyethylene, and linear low-density polyethylene. For example, a copolymer of ethylene and any one of, for example, propylene, vinyl acetate, acrylic acid, ethyl acrylate, and vinyl chloride, a copolymer of propylene and vinyl chloride, and modified bodies thereof may each be used as the olefin-based copolymer.

Of those, low-density polyethylene, linear low-density polyethylene, or the like is particularly preferred as the polyolefin-based resin to be used in this embodiment in consideration of, for example, a melting point, thermal fusibility, and a price.

Various particles may be used as the carbon particles. For example, carbon black particles (oil furnace black, thermal black, or acetylene black) and graphite particles may be used alone or in combination as a mixture thereof as the carbon particles.

The average particle diameter of the carbon particles is preferably from 10 nm to 100 nm. Typically, when the average particle diameter is from 10 nm to 100 nm, a stable resistance value is obtained. The average particle diameter of the carbon particles is more preferably from 20 nm to 50 nm. When the average particle diameter is less than 10 nm, the dispersion of the particles in the resin is poor, and hence resistance value unevenness and color unevenness are liable to occur. Meanwhile, when the average particle diameter is more than 100 nm, the surface resistivity of the layer 4 tends to be high, and hence a variation in surface resistivity thereof is liable to increase to cause unevenness in surface gloss thereof. A mixture of two or more kinds of carbon particles having different average particle diameters may be used as the carbon particles.

The blending ratios of the polyolefin-based resin and the carbon particles are preferably adjusted so that the surface resistivity of the black thermal fusion layer 4 may be from $10^5$ Ω/cm$^2$ to $10^{10}$ Ω/cm$^2$. To obtain such surface resistivity, for example, the ratio of a polyethylene resin with respect to the total weight of the black thermal fusion layer 4 is set to from 60 wt % to 95 wt %, and the ratio of the carbon particles with respect thereto is set to from 40 wt % to 5 wt %. It is preferred that the ratio of the polyethylene resin be set to from 80 wt % to 90 wt %, and the ratio of the carbon particles be set to from 20 wt % to 10 wt %. A resin composition having such blending ratios is easily obtained by appropriately kneading the polyethylene resin into a commercially available carbon color compound. When the ratio of the carbon particles is high, the total amount of far-infrared ray to be radiated increases. Meanwhile, when the ratio of the carbon particles is high, the strength at which the layer is thermally fused to the aluminum-coated base material 3 weakens, and the insulating property of the layer deteriorates. In addition, a case in which the ratio of the carbon particles is low is not preferred because the amount of the far-infrared ray to be radiated is small, and an antistatic action to be described later weakens.

The thickness of the black thermal fusion layer 4 is preferably from 0.05 mm to 0.35 mm, more preferably from 0.08 mm to 0.15 mm for achieving the following two objects: the prevention of the peeling of an aluminum fine piece from the aluminum-coated base material 3 and the radiation of far-infrared ray. When the thickness of the black thermal fusion layer 4 is 0.05 mm or less, its surface roughens at the time of its thermal fusion to the aluminum-coated base material 3, and the roughening is not preferred in terms of the prevention of the peeling of the aluminum fine piece. A case in which the thickness of the black thermal fusion layer 4 is more than 0.35 mm is not preferred because a rise time at the time of an increase in temperature of the sheet heater lengthens, and the overshoot thereof increases to increase the power consumption thereof.

As described above, the black thermal fusion layer 4 is formed by, for example, kneading the commercially available carbon color compound and the polyethylene resin, and forming the kneaded product into a film shape with a biaxial stretching apparatus. The black thermal fusion layer 4 is arranged on the aluminum-coated base material 3, and is thermally fused to the surface of the aluminum-coated base material 3 with a hot pressing apparatus or the like. The thermal fusion may be performed by utilizing a continuous heating rolling apparatus or the like.

In addition, for example, when the sheet heater 10 is used as a seat heater and a stress due to seating is large, reinforcement against a mechanical stress may be performed by superimposing and thermally fusing, onto the black thermal fusion layer 4, a homogeneous polyolefin-based resin film free of carbon.

<Cord-like Heating Element>

Figure 1C:
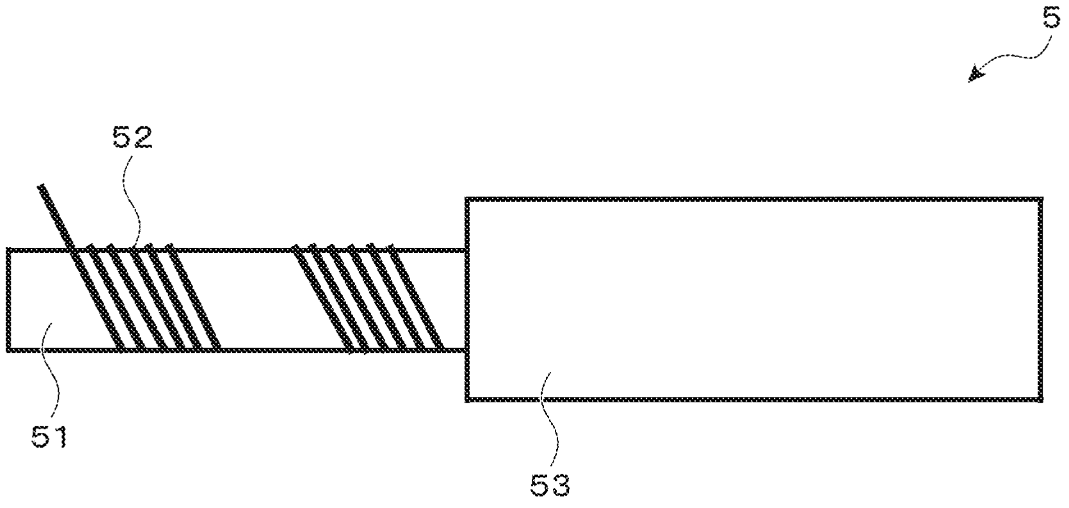
FIG. 1C is a view for schematically illustrating the structure of an example of a cord-like heating element according to one embodiment, and is a view for illustrating a state in which part of an insulation coating layer is removed and part of a twisted element wire is unwound.

FIG. 1C is a view for schematically illustrating the structure of an example of the cord-like heating element 5, and is a view for illustrating a state in which part of an insulation coating layer 53 is removed and part of a twisted element wire 52 is unwound. As illustrated in FIG. 1C, the cord-like heating element 5 has a structure in which the three to six twisted element wires 52 are aligned and laterally wound around a winding core 51 at an appropriate pitch in a spiral manner, and the insulation coating layer 53 that is electrically insulating is formed around the resultant.

A polyester fiber, an aromatic polyamide fiber, a wholly aromatic polyester fiber, or the like may be used in the winding core 51. For example, a fiber known as the product name "KEVLAR" may be used as the aromatic polyamide fiber, and a fiber known as the product name "VECTRAN" may be used as the wholly aromatic polyester fiber. For example, a bundled body of polyester fibers that is advantageous in terms of cost has been used as a winding core for a general-purpose sheet heating element. In addition, for example, a product obtained by bundling wholly aromatic polyester fibers each having a fineness of about 560 dtex into an outer diameter of from 0.2 mm to 0.3 mm has been used as a winding core for a seat heater. The wholly aromatic polyester fiber is thin, but is strong and excellent in heat resistance.

Figure 1D:
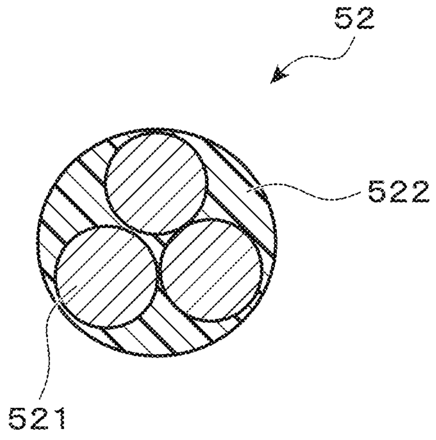
FIG. 1D is a schematic view for illustrating a cross-section of an example of the twisted element wire according to one embodiment.

FIG. 1D is a schematic view for illustrating a cross-section of an example of the twisted element wire 52. The twisted element wire 52 has a structure in which two or three resistance element wires 521 that are each a 0.3% tin-containing copper alloy wire having an outer diameter of from 0.05 mm to 0.08 mm are twisted, and a coating layer 522 made of a urethane resin is arranged on their surfaces.

The thickness of the insulation coating layer 53 is, for example, from about 0.1 mm to about 0.2 mm. The insulation coating layer 53 is formed from a resin, such as a tetrafluoroethylene-ethylene copolymer (ETFE) or a tetrafluoroethylene-hexafluoropropylene copolymer (FEP).

In the cord-like heating element 5 having such a configuration as described above, for example, when the wholly aromatic polyester fiber is used in the winding core 51, the winding core 51 is thin and has heat resistance, and for example, when a fluorine-based resin is used in the insulation coating layer 53, the insulation coating layer 53 is thin, and is excellent in heat resistance and strength. Accordingly, the cord-like heating element 5 can be made sufficiently thin. Even when the cord-like heating element 5 is thin, the breakage of the resistance element wire 521 due to a mechanical stress at the time of seating is prevented. In addition, the cord-like heating element 5 is so thin that a user is sufficiently suppressed from feeling discomfort owing to the unevenness of the cord-like heating element 5.

Another example of the cord-like heating element 5 of this embodiment is as described below. The cord-like heating element 5 may be, for example, a product obtained by twisting about 20 individual resistance element wires, each of which is obtained by coating the surface of a 3% silver-containing copper alloy wire having an outer diameter of about 0.06 mm with an electrical insulating material having a thickness of several micrometers such as a urethane resin, together into an outer diameter of about 0.4 mm The 3% silver-containing copper alloy wire has high strength, and can sufficiently withstand a mechanical stress at the time of seating even when an inclusion such as a winding core is absent. Accordingly, safety can be secured with an extremely thin individual insulating layer alone. The cord-like heating element having such configuration is generally called an individual insulation-type cord-like heating element. With such configuration, the outer diameter of the cord-like heating element 5 can be reduced, and hence a sense of strangeness at the time of the seating can be suppressed. Meanwhile, the 3% silver-containing copper alloy wire is expensive.

[With Regard to Sheet Heater]

The sheet heater 10 of this embodiment is excellent in safety, quick warming property, uniform heating property, and energy-saving property.

A sheet heater, which is obtained by directly sewing and fixing a cord-like heating element to a heat-insulating base material made of, for example, a nonwoven fabric or a polyurethane foam, has heretofore been known. In such sheet heater, although the temperature of the cord-like heating element itself increases quickly, the entirety of the sheet heater is hard to warm and hard to cool because the heat-insulating base material has a large porosity and a small thermal conductivity. In the temperature control of such sheet heater, an initial temperature increase immediately after the turning-on of its power source is moderate even when power is input at the maximum output. Accordingly, it takes a long time for the temperature of the heater to reach a set temperature. In addition, the entirety of the heater has a large heat-retention effect, and hence even when its temperature reaches the set temperature by the turning-on of the power source, and the input power is turned off by a temperature controller, an increase in temperature of the heater continues, resulting in that a temperature increase exceeding the set temperature called an overshoot may occur. The power consumption of the heater increases because of those reasons. In addition, a possible approach to suppressing the overshoot is to use a more complicated temperature controller. In this case, however, an increase in cost, a reduction in robustness, or the lengthening of a time period required to reach the set temperature occurs.

In contrast, the sheet heater 10 of this embodiment includes the aluminum-coated base material 3 in the base material 11 for holding a heating cord. The aluminum-coated base material 3 has a high thermal conductivity, and hence the temperature of the sheet heater 10 increases quickly and the power consumption thereof reduces. In addition, the temperature responsiveness of the sheet heater 10 is improved, and hence it becomes easier to control its temperature and the overshoot thereof is suppressed. The sheet heater 10 including the aluminum-coated base material 3 can achieve energy savings because of those reasons.

The sheet heater 10 of this embodiment includes the black thermal fusion layer 4 in the base material 11 for holding a heating cord. The features of the black thermal fusion layer 4 include the following four features.

(1) The black thermal fusion layer 4 in the base material 11 for holding a heating cord does not cause any trouble when the cord-like heating element 5 is sewed, and the layer functions as a thermal fusion material when the cord-like heating element 5 is bonded to the base material 11 for holding a heating cord. Accordingly, the black thermal fusion layer 4 can improve the degree of freedom in the design of the sheet heater 10.

(2) The black thermal fusion layer 4 prevents the tearing and peeling of the aluminum thin film of the aluminum-coated base material 3 due to a repeated load. For example, when the sheet heater 10 is used as a seat heater, the black thermal fusion layer 4 prevents the tearing and peeling of the aluminum thin film of the aluminum-coated base material 3 due to a repeated seating stress. Accordingly, the black thermal fusion layer 4 contributes to the prevention of, for example, health hazards on humans and electrical disturbance.

(3) The radiation of far-infrared ray by the black thermal fusion layer 4 leads to effective utilization of exothermic energy to exhibit an energy-saving effect. For example, when the sheet heater 10 is used in a seat heater, its operating temperature is generally from 40° C. to 50° C. When carbon is heated at a temperature in the band, the far-infrared ray is efficiently radiated. As a result, the radiation of electromagnetic wave with a wavelength band that have little effect on a human body is reduced, and the radiation of electromagnetic wave with a wavelength band effective in heating the human body is increased.

(4) The black thermal fusion layer 4 may be used together with a cord-like heating element whose reliability has been established through its use over long years. As a result, a high cost-effectiveness is obtained.

An aluminum foil heater obtained by fixing a cord-like heating element to an aluminum foil base material has heretofore been known. The aluminum foil heater has been known to be satisfactory in quick warming property and uniform heating property, and hence has been used as, for example, a heater for defrosting a refrigerator, a heater for melting snow, or a rice-cooking or temperature-holding heater in an electric rice cooker.

However, when an impulsive load is repeatedly applied to the aluminum foil heater, a crack may occur in its aluminum foil, and as a result, the function of the aluminum foil as a uniform heating body is lost. In addition, when a crack occurs in the aluminum foil, an aluminum fine fragment may scatter from the crack portion. In addition, when a load is applied to the aluminum foil heater, the aluminum foil deforms to generate metallic noise. The noise becomes a problem depending on applications. For example, when the aluminum foil heater is used in a seat heater, such breakage or scattering of the aluminum foil as described above may occur owing to a load caused by repeated seating, or a passenger may feel noise at the time of the seating to be uncomfortable.

In contrast, in the sheet heater 10 of this embodiment, the tearing, peeling, and the like of the aluminum thin film of the aluminum-coated base material 3 are prevented because the black thermal fusion layer 4 is fused to the aluminum-coated base material 3. In addition, noise is suppressed.

A leakage current at the time of a failure when the sheet heater 10 is used in a seat heater is investigated. When the sheet heater 10 is used in the seat heater, concern is raised about the breakage of the resistance element wire 521 of the cord-like heating element 5 due to a repeated seating stress. When the breakage of the resistance element wire 521 occurs, the resistance value of the broken portion increases to establish a locally heated state. Heat at this time softens the coating layer 522 made of a urethane resin and the insulation coating layer 53. In addition, when the breakage occurs, the resistance element wire 521, which has followed the stresses of twisting and lateral winding, is freed from those stresses. As a result, a wire end of the broken resistance element wire 521 is assumed to protrude from the above-mentioned softened portion.

To cope with such circumstances, heretofore, in a seat heater using a cord-like heating element, a thick insulating material has been used in a heat-insulating base material serving as the ground of the heater, and a thick insulating material made of leather or a synthetic resin has also been used in the outer cover thereof so that the cord-like heating element may not be brought into contact with a human body. In addition, the voltage of the power source thereof is a voltage as low as DC 12 V.

Meanwhile, in the sheet heater 10 according to this embodiment, the cord-like heating element 5 is arranged on the aluminum-coated base material 3 and the black thermal fusion layer 4, and when the above-mentioned breakage of the resistance element wire 521 occurs, and in the worst case, a wire end thereof is brought into direct contact with the aluminum-coated base material 3, a current leaks to the aluminum-coated base material 3. To prevent the foregoing, for example, a polyolefin-based insulating thermal fusion film free of carbon only needs to be fused to the surface of the aluminum-coated base material 3 instead of the black thermal fusion layer 4. Meanwhile, in the polyolefin-based insulating thermal fusion film free of carbon, an action of securing an insulating property at the time of the breakage of the resistance element wire 521, and a preventing effect on the tearing and peeling of the aluminum thin film of the aluminum-coated base material 3 are obtained. However, in the polyolefin-based insulating thermal fusion film free of carbon, an energy-saving effect exhibited by far-infrared ray radiation is not obtained.

In this embodiment, the black thermal fusion layer 4, which contains carbon and has a high resistance, but is not an insulator, is thermally fused to the surface of the aluminum-coated base material 3 instead of the above-mentioned insulating thermal fusion film for preventing electric leakage. The foregoing places emphasis on the obtainment of an energy-saving effect exhibited by the far-infrared ray-radiating function of the black thermal fusion layer 4.

The value of the leakage current through the black thermal fusion layer 4 is investigated. The resistance of the black thermal fusion layer 4 in its longitudinal direction is high, and hence when a voltage of DC 12 V is brought into contact therewith, the leakage current is estimated to be about 1 μA or less, though the value varies depending on a place. An example of a poor case concerning the leakage current is investigated. Suppose a case in which breakage occurs at a site near the positive terminal side of the cord-like heating element 5 connected to a power source of DC 12 V, a wire end of one of the broken resistance element wires 521 is vertically brought into abutment with the black thermal fusion layer 4, and the aluminum-coated base material 3 serving as a ground is brought into contact with the negative side of the power source. In this case, the diameter of the resistance element wire 521 is assumed to 0.075 mm, and the thickness and surface resistance of the black thermal fusion layer 4 are assumed to 0.15 mm and $3\times10^8$ $\Omega/cm^2$, respectively. The leakage current flows in a substantially vertical direction without spreading in a lateral direction because the surface resistance is high. The resistance value of the black thermal fusion layer 4 with which the one thin resistance element wire 521 is brought into abutment is about 750 MΩ or more, and hence the leakage current is estimated to be 0.02 μA or less. Even when the three resistance element wires 521 break, the leakage current is less than 1 μA. The value may be negligible as compared to the leakage current of the entirety of a vehicle.

The commercially available carbon color compound serving as a raw material for the black thermal fusion layer 4 has been used for preventing charging and preventing electromagnetic interference. Even when the compound is diluted with a polyethylene resin, an EVA resin, or the like, its antistatic function is maintained, and hence the black thermal fusion layer 4 containing the compound can function as an antistatic body. As described above, unlike the insulating thermal fusion film free of carbon, the black thermal fusion layer 4 containing carbon has an antistatic function in addition to the above-mentioned far-infrared ray-radiating function.

The sheet heater according to this embodiment may be used in, for example, a seat heater for an automobile. The above-mentioned energy-saving function is important in a seat heater in an electric vehicle that has been rapidly spreading in recent years. When the power consumption of the heater is suppressed, the power consumption of the battery of the electric vehicle is reduced, and hence the travel distance thereof per charging can be lengthened.

In addition, in particular, the electric vehicle has been mounted with a larger number of various electronic devices using low-voltage power supplies than before for, for example, automatic driving with artificial intelligence. In an automobile seat, a synthetic resin, such as polyurethane or polyester, has been used in the base and outer cover of the seat, and a seat heater arranged therebetween, and hence static electricity is liable to be generated by friction therebetween. The charging state of a high voltage associated with the static electricity and noise generated by the discharge of the high voltage may affect the electronic devices. In contrast, the antistatic function of the black thermal fusion layer 4 in the sheet heater 10 of this embodiment exhibits a reducing effect on the noise affecting the electronic devices.

In addition, such a seat heater as described above is not limited for use in an automobile seat, and may also be used in the seats of other vehicles and the like, and the seats of various facilities and the like. In addition, the above-mentioned sheet heater may also be used in, for example, various plane warming tools, such as an electric carpet and a medical health mat.

[Bonded Sheet Heater]

Figure 2A:
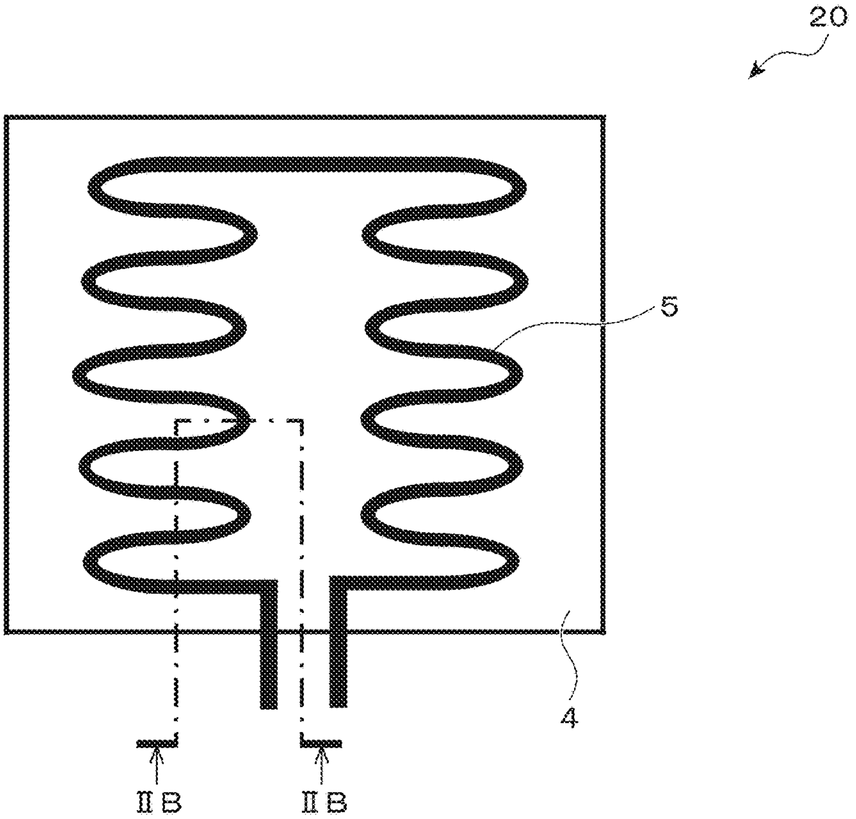
FIG. 2A is a schematic plan view for illustrating the outline of an example of the configuration of a bonded sheet heater according to a second embodiment.
Figure 2B:
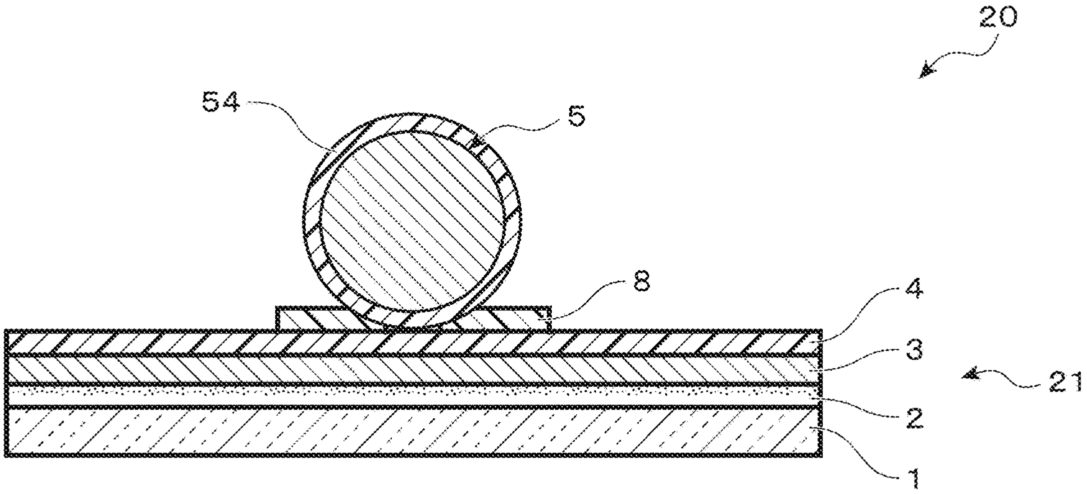
FIG. 2B is a view for schematically illustrating the outline of a cross-section of the bonded sheet heater along the line IIB-IIB illustrated in FIG. 2A.

A second embodiment relates to a bonded sheet heater. Differences between the first embodiment and the second embodiment are described, and the same portions are given the same reference symbols, and their description is omitted. FIG. 2A is a schematic plan view for illustrating the outline of an example of the configuration of a sheet heater 20 according to this embodiment. FIG. 2B is a schematic sectional view for illustrating the outline of a cross-section of the sheet heater 20 along the line IIB-IIB illustrated in FIG. 2A.

As illustrated in FIG. 2B, the sheet heater 20 of the second embodiment includes a base material 21 for holding a heating cord, the base material having the same configuration as that of the base material 11 for holding a heating cord of the sheet heater 10 of the first embodiment. The cord-like heating element 5 is fixed onto the base material 21 for holding a heating cord through bonding.

In the second embodiment, a thermal fusion layer 54 is arranged on the same cord-like heating element 5 as that in the case of the first embodiment by extrusion or the like so as to coat its outer periphery. A material for the thermal fusion layer 54 is preferably the polyolefin-based resin used in the black thermal fusion layer 4, and is free of carbon. For example, polyethylene, polypropylene, or polybutene may be used in the thermal fusion layer 54. Of those, low-density polyethylene, linear low-density polyethylene, or the like is particularly preferred in terms of a melting point, thermal fusibility, and a price. The thickness of the thermal fusion layer 54 is relatively large, and is preferably, for example, from about 0.15 mm to about 0.25 mm because a gap needs to be secured between the black thermal fusion layer 4 and the cord-like heating element 5 while adhesive strength therebetween is secured.

In addition, a thermal fusion layer 8 that is similar to the thermal fusion layer 54 coating the cord-like heating element 5 may be arranged on the surface portion of the black thermal fusion layer 4 on which the cord-like heating element 5 coated with the thermal fusion layer 54 is arranged. In addition, the thermal fusion layer 8 may be formed by the thermal fusion layer 54 coating the cord-like heating element 5 at the time of its thermal fusion.

The black thermal fusion layer 4 and the cord-like heating element 5 coated with the thermal fusion layer 54 are thermally fused and fixed to each other through hot pressing or the like. At this time, the temperature, pressure, and time of the hot pressing are controlled, and hence a fine gap is secured between the cord-like heating element 5 and the thermal fusion layer 54. The gap achieves high durability because the deformation of the sheet heater 20 and the cord-like heating element 5 by an external load is absorbed by the sliding of the cord-like heating element 5 in the thermal fusion layer 54.

When the cord-like heating element 5 has such a shape that unevenness caused by twisting is exposed to its surface like the above-mentioned individual insulation-type cord-like heating element, it becomes difficult to uniformly secure such a fine gap between the heating element and the thermal fusion layer 54 as described above. Accordingly, in this embodiment, such cord-like heating element 5 coated with the insulation coating layer 53 as illustrated in FIG. 1C is preferably used.

The bonded sheet heater 20 of the second embodiment is excellent in, for example, safety, quick warming property, uniform heating property, and energy-saving property as in the sewed sheet heater 10 of the first embodiment, and hence provides the same effects.

[Coated Sheet Heater]

Figure 3A:
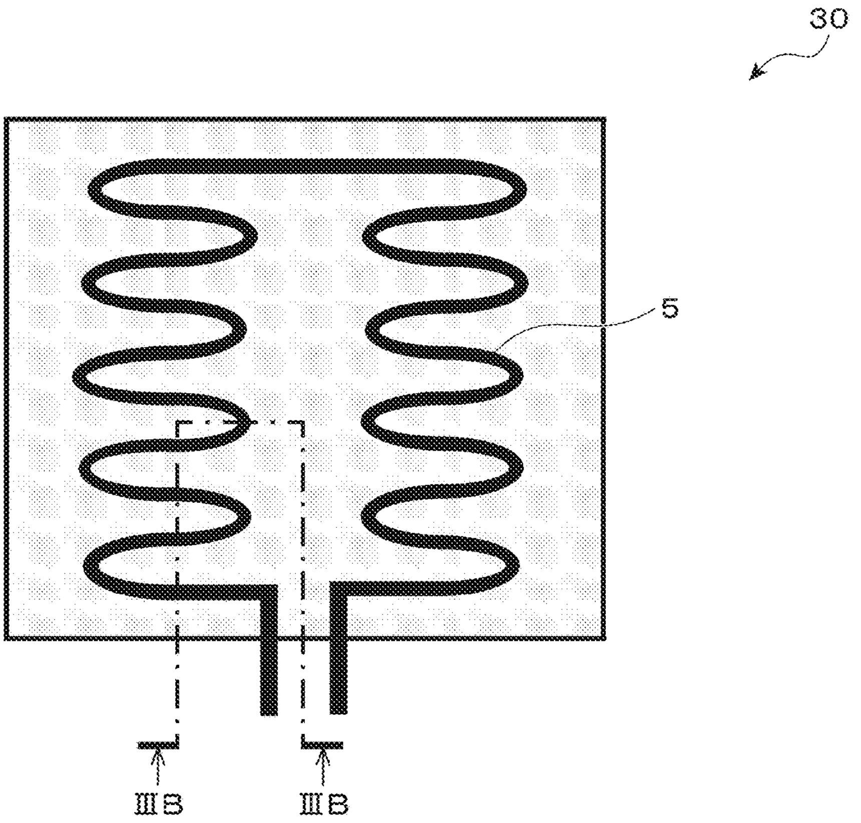
FIG. 3A is a schematic plan view for illustrating the outline of an example of the configuration of a coated sheet heater according to a third embodiment.

A third embodiment relates to a coated sheet heater. Differences between the second embodiment and the third embodiment are described, and the same portions are given the same reference symbols, and their description is omitted. FIG. 3A is a schematic plan view for illustrating the outline of an example of the configuration of a sheet heater 30 according to this embodiment. FIG. 36 is a schematic sectional view for illustrating the outline of a cross-section of the sheet heater 30 along the line IIIB-IIIB illustrated in FIG. 3A.

Figure 3B:
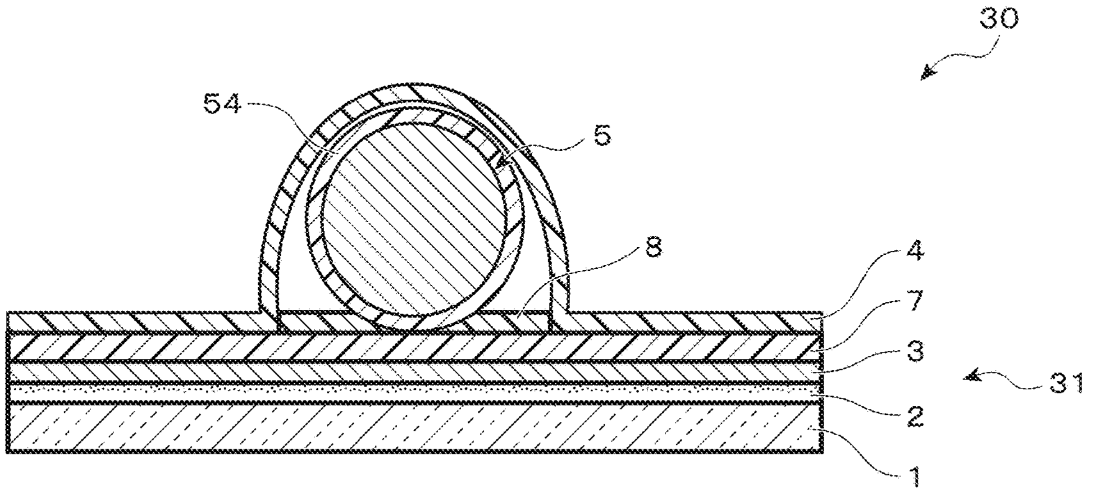
FIG. 3B is a view for schematically illustrating the outline of a cross-section of the coated sheet heater along the line IIIB-IIIB illustrated in FIG. 3A.

As illustrated in FIG. 3B, the sheet heater 30 of the third embodiment includes a base material 31 for holding a heating cord including the heat-insulating base material 1, the adhesive layer 2, and the aluminum-coated base material 3 as in the base material 21 for holding a heating cord of the bonded sheet heater 20 of the second embodiment. In the base material 31 for holding a heating cord of this embodiment, a thermal fusion layer 7 is arranged on the surface of the aluminum-coated base material 3. The thickness of the thermal fusion layer 7 is the same as that of the black thermal fusion layer 4 of the base material 21 for holding a heating cord of the bonded sheet heater 20 of the second embodiment. Meanwhile, a material for the thermal fusion layer 7 is different from that for the black thermal fusion layer 4. The material for the thermal fusion layer 7 is the same as that for the thermal fusion layer 54 coating the cord-like heating element 5 of the second embodiment. The thermal fusion layer 7 prevents the peeling of the aluminum thin film of the aluminum-coated base material 3, and has a function of thermally fusing the cord-like heating element 5 coated with the thermal fusion layer 54 to the aluminum-coated base material 3.

In addition, as in the case of the bonded sheet heater 20 of the second embodiment, the thermal fusion layer 8 that is similar to the thermal fusion layer 54 may be arranged on the surface portion of the thermal fusion layer 7 on which the cord-like heating element 5 coated with the thermal fusion layer 54 is arranged.

The aluminum-coated base material 3, the thermal fusion layer 7, and the cord-like heating element 5 coated with the thermal fusion layer 54 are thermally fused and fixed to each other through hot pressing or the like. At the time of the thermal fusion and fixing, the temperature, pressure, and time of the hot pressing are controlled, and hence a fine gap is secured between the cord-like heating element 5 and the thermal fusion layer 54. The gap achieves high durability because the deformation of the sheet heater 30 and the cord-like heating element 5 by an external load is absorbed by the sliding of the cord-like heating element 5 in the thermal fusion layer 54.

In the sheet heater 30 of this embodiment, the base material 31 for holding a heating cord and the cord-like heating element 5 are thermally fused and fixed to each other. In addition, the black thermal fusion layer 4 that is the same as those in the cases of the first embodiment and the second embodiment is arranged so as to coat the entire surface of the sheet heater 30, and the black thermal fusion layer 4 is thermally fused and fixed thereto through hot pressing or the like. Thus, the coated sheet heater 30 is formed.

The coated sheet heater 30 of the third embodiment is excellent in safety, quick warming property, uniform heating property, and energy-saving property as in the sewed sheet heater 10 of the first embodiment and the bonded sheet heater 20 of the second embodiment, and hence provides the same effects.

EXAMPLES

Examples of the sheet heaters according to the above-mentioned three embodiments are described.

[Sample]

<Common Part>

In each of Examples, a semirigid polyurethane foam conforming to an MVSS 302 flame retardancy standard, and having a density of about 40 kg/m$^2$ and a hardness of 98 N or more was used as the heat-insulating base material 1. The thickness of the heat-insulating base material 1 was set to 3.5 mm. A plain weave cotton fabric coated with aluminum through vapor deposition on one of its surfaces, the fabric being commercially available as an ironing board cover, was used as the aluminum-coated base material 3. A chloroprene rubber-based solvent-type adhesive GS1Z (manufactured by Konishi Co., Ltd.) was used as an adhesive that bonded the heat-insulating base material 1 and the aluminum-coated base material 3 to each other to become the adhesive layer 2. The adhesive was applied to the heat-insulating base material 1 by spraying, and was dried with air. Then, the top of the adhesive was covered with the aluminum-coated base material 3, and the adhesive was bonded and cured through hot pressing at 60° C. for 5 minutes.

The black thermal fusion layer 4 was produced as described below. A color compound available under the product name "PAPIOSTAT PST5011" (manufactured by Tokyo Printing Ink Mfg. Co., Ltd.), which was a commercially available color compound, was used as a main material for the black thermal fusion layer 4. The color compound is obtained by dispersing carbon black in low-density polyethylene. A low-density polyethylene resin (LDPE) L1640 (manufactured by Asahi Kasei Corporation), an ethylene-vinyl acetate copolymer (EVA) NUC-3830 (manufactured by ENEOS NUC Corporation), a general-purpose antioxidant, and a general-purpose flame retardant were added to the color compound so that a formulation shown in Table 1 was obtained. The mixture of those materials was sufficiently stirred with a kneader, and was then formed into the black thermal fusion layer 4 having a thickness of 0.15 mm with a biaxially stretched film-forming apparatus formed of a short-axis extruder. In this case, the average surface resistance of a formulation 1 was about $10^8$ Ω/cm$^2$, and the average surface resistance of a formulation 2 was about $10^6$ Ω/cm$^2$.

TABLE 1

Formulation table (unit: part(s))

| Product name | Brand | Formulation 1 | Formulation 2 |
|---|---|---|---|
| Color pellet black | PST5011 | 100.0 | 100.0 |
| Low-density polyethylene | L1640 | 30.0 | 5.0 |
| EVA resin | NUC3830 | 10.0 | 5.0 |
| Antioxidant | General-purpose | 0.1 | 0.1 |
| Flame retardant | General-purpose | 0.1 | 0.1 |
| Total | | 140.2 | 110.2 |

The cord-like heating element 5 was produced as described below. A product obtained by bundling wholly aromatic polyester fibers available under the product name "VECTRAN HT" (manufactured by Kuraray Co., Ltd.), the fibers having a fineness of 560 dtex/100 f, into an outer diameter of 0.25 mm was used as the winding core 51. A 3% tin-containing copper alloy wire having a diameter of 0.075 mm was used as the resistance element wire 521. The twisted element wire 52 was produced by: twisting the three resistance element wires 521; and coating the surfaces of the element wires with urethane to provide the coating layer 522. The six twisted element wires 52 were aligned and laterally wound around the above-mentioned winding core 51 at a pitch of 1.815 mm. The top of the resultant was coated with an ETFE resin serving as the insulation coating layer 53 by extrusion so that the resin had a thickness of 0.2 mm. Thus, the cord-like heating element 5 having an outer diameter of 0.9 mm was produced. In all of Examples 1 to 5, and Comparative Examples 1 and 2 to be described later, the laying length and resistance value of the cord-like heating element 5 were 5.75 μm±0.06 μm and 1.9Ω±0.02Ω, respectively.

Example 1

As Example 1, the sewed sheet heater 10 according to the first embodiment illustrated in FIG. 1B was produced, and an experiment was performed. The sewed sheet heater 10 was produced as described below.

The black thermal fusion layer 4 based on the formulation 1 of Table 1 was arranged on the heat-insulating base material 1 and the aluminum-coated base material 3 bonded to each other in advance. The entirety of the resultant was pressed and heated through hot pressing so that the aluminum-coated base material 3 and the black thermal fusion layer 4 were thermally fused to each other. A heating temperature was set to 180° C., and a heating time was set to 20 seconds. Those integrated plane bodies were used as the base material 11 for holding a heating cord. The cord-like heating element 5 was laid on the surface of the base material 11 for holding a heating cord with a program-controlled automatic laying sewing machine in a prespecified pattern, and at the same time, the heating element was sewed thereto in a zigzag manner with the upper thread 6*a* and the lower thread 6*b*. Thus, the sheet heater 10 of Example 1 was produced.

Example 2

As Example 2, the sewed sheet heater 10 according to the first embodiment illustrated in FIG. 1B was produced, and an experiment was performed. Example 2 is different from Example 1 only in that the formulation of the black thermal fusion layer 4 is the formulation 2 of Table 1 instead of the formulation 1 of Table 1.

Example 3

As Example 3, the bonded sheet heater 20 according to the second embodiment illustrated in FIG. 2B was produced, and an experiment was performed. The bonded sheet heater 20 was produced as described below.

The thermal fusion layer 54 was formed on the surface of the cord-like heating element 5 with a general-purpose extruder. A low-density polyethylene resin (LDPE) L1640 (manufactured by Asahi Kasei Corporation) was used in the thermal fusion layer 54. The thickness of the thermal fusion layer 54 was set to 0.2 mm. The thermal fusion layer 54 was extruded into a tube shape so that a slight gap was formed between the layer and the cord-like heating element 5.

A laying table having embedded therein a spring pin at a position along a laying pattern was used in laying. The cord-like heating element 5 coated with the above-mentioned thermal fusion layer 54 was hitched to the spring pin of the laying table and laid. The base material 21 for holding a heating cord that was the same as the base material 11 for holding a heating cord of Example 1 was arranged thereon with the black thermal fusion layer 4 directed downward. The entirety of the resultant was pressed and heated through hot pressing so that the thermal fusion layer 54 of the cord-like heating element 5 and the black thermal fusion layer 4 of the base material 21 for holding a heating cord were thermally fused to each other. A heating temperature was set to 180° C., and a heating time was set to 10 seconds. Thus, the sheet heater 20 of Example 3 was produced.

Example 4

As Example 4, the bonded sheet heater 20 according to the second embodiment illustrated in FIG. 2B was produced, and an experiment was performed. Example 4 is different from Example 3 only in that the thickness of the black thermal fusion layer 4 is set to 0.35 mm.

Example 5

As Example 5, the coated sheet heater 30 according to the third embodiment illustrated in FIG. 3B was produced, and an experiment was performed. The coated sheet heater 30 was produced as described below.

The thermal fusion layer 7 formed of a transparent low-density polyethylene film having a thickness of 0.15 mm was arranged on the heat-insulating base material 1 and the aluminum-coated base material 3 bonded to each other in advance. The entirety of the resultant was pressed and heated through hot pressing so that the aluminum-coated base material 3 and the thermal fusion layer 7 were thermally fused to each other. A heating temperature was set to 180° C., and a heating time was set to 20 seconds. Those integrated plane bodies were used as the base material 31 for holding a heating cord.

The cord-like heating element 5 coated with the thermal fusion layer 54 was produced in the same manner as in Example 3. The cord-like heating element 5 coated with the thermal fusion layer 54 was hitched to the spring pin of a laying table and laid in the same manner as in Example 3. The base material 31 for holding a heating cord was arranged thereon with the thermal fusion layer 7 directed downward. The entirety of the resultant was pressed and heated through hot pressing so that the thermal fusion layer 54 of the cord-like heating element 5 and the thermal fusion layer 7 of the base material 31 for holding a heating cord were thermally fused to each other. Thus, an intermediate assembly was obtained. A heating temperature was set to 180° C., and a heating time was set to 10 seconds.

Subsequently, the entire surface of the top of the intermediate assembly was covered with the black thermal fusion layer 4, and the entirety of the resultant was pressed and heated through hot pressing so that the thermal fusion layer 7 and the cord-like heating element 5, and the black thermal fusion layer 4 were thermally fused to each other. A heating temperature was set to 180° C., and a heating time was set to 20 seconds. Thus, the sheet heater 30 of Example 5 was produced.

Comparative Example 1

As Comparative Example 1, the cord-like heating element 5 was laid on the heat-insulating base material 1, and at the same time, the heating element was sewed thereto with the upper thread 6*a* and the lower thread 6*b* to produce a sheet heater. The sheet heater corresponds to a product obtained by removing the adhesive layer 2, the aluminum-coated base material 3, and the black thermal fusion layer 4 from the sewed sheet heater 10 according to the first embodiment. Comparative Example 1 has heretofore been known as the structure of a sheet heater to be used in a seat heater.

Comparative Example 2

As Comparative Example 2, the cord-like heating element 5 was laid on a base material for holding a heating cord including the heat-insulating base material 1, the adhesive layer 2, and the aluminum-coated base material 3, and at the same time, the heating element was sewed thereto with the upper thread 6*a* and the lower thread 6*b* to produce a sheet heater. The sheet heater corresponds to a product obtained by removing the black thermal fusion layer 4 from the sewed sheet heater 10 according to the first embodiment. Comparative Example 2 has a structure obtained by adding the aluminum-coated base material 3 to a sheet heater that has heretofore been known.

Comparison Between Contents of Examples and Comparative Examples

The combinations of the respective elements and conditions for forming Examples 1 to 5, and Comparative Examples 1 and 2 described above are shown in Table 2.

TABLE 2

Combinations of individual elements of Examples and Comparative Examples

| Element | Condition | Example 1 | Example 2 | Example 3 | Example 4 | Example 5 | Comparative Example 1 | Comparative Example 2 |
|---|---|---|---|---|---|---|---|---|
| Fixing mode of cord-like heating element | Sewing | Selected | Selected | ** | ** | ** | Selected | Selected |
| | Bonding | ** | ** | Selected | Selected | Selected | ** | ** |
| Material for black thermal fusion layer | Formulation 1 | Selected | ** | Selected | Selected | Selected | ** | ** |
| | Formulation 2 | ** | Selected | ** | ** | ** | ** | ** |
| Arrangement of black thermal fusion layer | Underlaying | Selected | Selected | Selected | Selected | ** | ** | ** |
| | Coating | ** | ** | ** | ** | Selected | ** | ** |
| Thickness of black thermal fusion layer | 0.15 mm | Selected | Selected | Selected | ** | Selected | ** | ** |
| | 0.35 mm | ** | ** | ** | Selected | ** | ** | ** |
| Aluminum base material | Presence or absence | Selected | Selected | Selected | Selected | Selected | ** | Selected |

[Methods of Measuring Characteristics of Sheet Heater]

The sheet heater sample of each of Examples 1 to 5, and Comparative Examples 9 and 2 was arranged on the heat-insulating and elastic seat of an automobile, and the temperature characteristic of the surface of the sheet heater was directly measured while the heater was not covered with the outer cover of the seat. The measurement was performed in a windless environment at a room temperature of 25° C. A copper heat-collecting plate measuring 50 mm long by 50 mm wide by 1 mm thick, the plate having a thermocouple bonded to its central portion, was used in the measurement. The heat-collecting plate was placed in the central portion of the sheet heater, and was brought into close contact with the sheet heater with a weight of 1 kg being placed a heat-insulating material larger than the copper heat-collecting plate therebetween. The thermocouple was connected to a general-purpose temperature logger to record a change in temperature of the heater surface every 1 second.

In addition, a thermocouple for temperature control was bonded to the surface of the sheet heater corresponding to the position of the thermocouple for measurement bonded to the central portion of the copper heat-collecting plate. The thermocouple for temperature control was arranged at such a position as to be out of contact with the cord-like heating element 5. The thermocouple for temperature control was connected to a temperature controller. The resistance of the cord-like heating element 5 had temperature dependence, and hence while a wattmeter was viewed, an applied voltage (about 12.5 V) was finely adjusted for each sample in advance so that a power consumption at 40° C. became 82.1 W.

<Rise Time>

Each of the sheet heaters was directly connected to a DC power source without through any temperature regulator. The switch of the power source was turned on, and an increase in temperature of the heater was recorded with a temperature logger. Time periods required for the surface temperature of the sheet heater to reach 40° C. and 50° C. were each measured on the basis of the record.

<Overshoot Temperature>

Each of the sheet heaters was connected to a DC power source through a temperature controller. The temperature controller was set so that a power supply was turned off when the temperature of the heater measured with a thermocouple for temperature control became 40° C. The switch of the power source was turned on, and an increase in temperature of the heater was recorded in a temperature logger. The highest temperature of the first overshoot exceeding 40° C. was measured on the basis of the record, and a difference between the temperature and 40° C. was determined as an overshoot temperature.

<Power Consumption>

Each of the sheet heaters was connected to a DC power source through an on-off-type temperature controller. The switch of the power source was turned on to establish an automatic temperature control state, and the power consumption was measured. At this time, the off-point set temperature and on-point set temperature of the temperature controller were set to 40° C. and 39.5° C., respectively, and a hysteresis width of 0.500 was set. The power consumption was measured with an integrating wattmeter. The measurement was performed for a time period of 30 minutes from the instant when the switch of the power source was turned on. The average of the integral powers was determined as an average power consumption.

<Far-Infrared Ray Heating>

Each of the sheet heaters alone was hung in windless air at 25° C., and was connected to a DC power source through a temperature controller. The temperature of the temperature controller was set to 40° C. to establish an automatic temperature control state. A black cloth large enough to hide the sheet heater was stretched in air distant from the surface of the sheet heater by 15 cm. The temperature of the surface of the black cloth corresponding to the central portion of the sheet heater was measured through use of far-infrared thermography. The measurement was performed for 10 minutes at intervals of 1 minute, and the average of the measured temperatures was determined as far-infrared ray heating.

<Seating Stress>

A test subject was obtained as follows: each of the sheet heaters was arranged between the heat-insulating and elastic seat and outer cover of an automobile, and a voltage of DC 13.5 V was applied to the sheet heater. The rotation and sliding of the seat for boarding and seating, the application of a load of 40 kg, and 20 times of vertical vibration were performed, and then a reverse operation for unseating and alighting was performed by using a human body-imitating robot. The foregoing operations were defined as 1 cycle. A lifetime test was performed by repeating the cycle 10,000 times. After the test, whether or not an aluminum fine piece produced by the breakage of the aluminum-coated base material 3 protruded or scattered from the black thermal fusion layer 4 or the thermal fusion layer 7 made of polyethylene was visually checked. In addition, whether or not a carbon-containing fine piece scattered owing to the breakage of the black thermal fusion layer 4 was visually checked.

<Charging Prevention>

Each of the sheet heaters was arranged between the heat-insulating and elastic seat and outer cover of an automobile, and a DC power source was connected to the sheet heater. However, the switch of the power source was turned off to establish a de-energized state. A region of about 30-centimeter square in the surface of the outer cover was strongly rubbed with a polyester cloth 10 times, and immediately thereafter, a charging voltage at a position distant therefrom by 25 mm was measured with a static electricity tester.

[Results of Measurement of Characteristics of Sheet Heater]

The above-mentioned various kinds of measurement were performed, and the results thereof were shown in Table 3.

TABLE 3

Experimental results

| Item | Unit | Example 1 | Example 2 | Example 3 | Example 4 | Example 5 | Comparative Example 1 | Comparative Example 2 |
|---|---|---|---|---|---|---|---|---|
| Rise time at 40° C. | (second(s)) | 120 | 117 | 116 | 138 | 125 | 280 | 112 |
| Rise time at 50° C. | (second(s)) | 315 | 318 | 311 | 377 | 322 | 569 | 303 |
| Overshoot temperature | (° C.) | 1.7 | 1.6 | 1.3 | 2.4 | 1.9 | 5.7 | 1.1 |
| Average power consumption | (W) | 36.8 | 37.1 | 36.2 | 39.9 | 38.2 | 43.5 | 35.6 |
| Far-infrared ray heating | (° C.) | 28.4 | 28.9 | 29.1 | 30.6 | 29.8 | 26.1 | 26.9 |
| Seating test | | No abnormality | No abnormality | No abnormality | No abnormality | No abnormality | ** | Crack |
| Charging voltage | (kV) | 2.8 | 1.7 | 2.5 | 2.5 | 2.0 | 5.8 | 3.4 |

<Evaluation on Rise Time>

Examples 1 to 5 were structures thermally similar to each other, the structures each including the aluminum-coated base material 3, and hence a difference in rise time among the structures was slight. It was revealed from comparison between the rise times at 40° C. of Examples 1 to 5 and Comparative Example 1, in which the aluminum-coated base material 3 was absent and the base material for holding a heating cord was formed only of the heat-insulating base material 1, that Examples 1 to 5 each had a quick warming property twice or more as high as that of Comparative Example 1, In addition, even in Comparative Example 2 in which the base material for holding a heating cord included the heat-insulating base material 1, the adhesive layer 2, and the aluminum-coated base material 3, a significant quick warming property comparable to those of Examples 1 to 5 was observed. As described above, it was able to be recognized that the arrangement of the aluminum-coated base material 3 exhibited a large effect on a quick warming property.

Even when the rise times at 50° C. of Examples 1 to 5 and Comparative Example 1 were compared to each other, it was recognized that Examples 1 to 5 each had a quick warming property nearly twice as high as that of Comparative Example 1. However, when Comparative Example 2 in which the black thermal fusion layer 4 was not arranged, and Example 3 and Example 4 different from each other in thickness of the black thermal fusion layer 4 were compared to each other, Example 4 in which the black thermal fusion layer 4 was relatively thick was somewhat inferior in quick warming property to the others. It was revealed that the thickness of the black thermal fusion layer 4 was desirably prevented from being excessively increased, for example, the thickness of the black thermal fusion layer 4 was preferably less than 0.35 mm.

It was revealed that the arrangement of the aluminum-coated base material 3 in the base material for holding a heating cord shortened its rise time, and as a result, the sheet heater was able to achieve power savings.

<Evaluation on Overshoot>

There was not a very large difference in magnitude of the overshoot temperature among Examples 1 to 5 having structures thermally similar to each other. When the overshoot temperatures of Examples 1 to 5 and Comparative Example 1 were compared to each other, the overshoot temperature of each of Examples 1 to 5 was as small as from ½ to ¼ of the overshoot temperature of Comparative Example 1. When the overshoot temperatures of Comparative Example 2 in which the base material for holding a heating cord included the aluminum-coated base material 3 and Comparative Example 1 were compared to each other, the overshoot temperature of Comparative Example 2 was extremely as small as ⅕ of the overshoot temperature of Comparative Example 1. It was made clear from those results that a reduction in overshoot resulted from a quick thermal response of the aluminum-coated base material 3.

When Comparative Example 2 in which the black thermal fusion layer 4 was not arranged, and Example 3 and Example 4 different from each other in thickness of the black thermal fusion layer 4 were compared to each other, the overshoot temperature was somewhat large in Example 4 in which the black thermal fusion layer 4 was relatively thick. It was revealed that the thickness of the black thermal fusion layer 4 was desirably prevented from being excessively increased, for example, the thickness of the black thermal fusion layer 4 was preferably less than 0.35 mm.

It was revealed that the arrangement of the aluminum-coated base material 3 in the base material for holding a heating cord provided a quick thermal response, and as a result, the sheet heater was able to achieve power savings.

<Evaluation on Average Power Consumption>

In each of Examples 1 to 5, the average power consumption was suppressed to a low level as compared to that of Comparative Example 1. Particularly in Examples 1 to 3, power savings of 15% or more were able to be achieved as compared to Comparative Example 1. The fact that the average power consumption of Example 5 is somewhat larger than the average power consumptions of Examples 1 to 3 may show that the sheet heater has such a structure that its outermost layer is coated with the black thermal fusion layer 4, and hence the heater has a heat-retention property and a somewhat slow thermal response. The foregoing can be understood from the fact that the average power consumption of Comparative Example 2 in which the aluminum-coated base material 3 is exposed is relatively low, and the relatively low average power consumption shows the following features: the sheet heater of Comparative Example 2 has a high heat-dissipating property and a quick thermal response. When Example 3 and Example 4 different from each other in thickness of the black thermal fusion layer 4 were compared to each other, the average power consumption was somewhat large in Example 4 in which the black thermal fusion layer 4 was relatively thick. It was revealed that the thickness of the black thermal fusion layer 4 was desirably prevented from being excessively increased, for example, the thickness of the black thermal fusion layer 4 was preferably less than 0.35 mm. It was revealed that the sheet heaters according to the embodiments were each able to achieve power savings.

<Evaluation on Far-infrared Ray Radiation>

In each of Examples 1 to 5 concerning the sheet heaters each including the black thermal fusion layer 4, the surface temperature of the black cloth for measurement showed a temperature increase of from about 3.5° C. to about 5° C. The temperature increase includes a temperature increase due to far-infrared ray radiation. In contrast, in each of Comparative Examples 1 and 2 concerning the sheet heaters in each of which the black thermal fusion layer 4 was absent, an increase in surface temperature of the black cloth for measurement was small. In each of Example 4 in which the black thermal fusion layer 4 was relatively thick and Example 5 in which the black thermal fusion layer 4 served as the outermost layer, the surface temperature of the black cloth for measurement was somewhat higher than those of Examples 1 to 3.

In each of Examples, the temperature measurement was performed at a position distant from the sheet heater by 15 cm. In contrast, in the case where the sheet heater is used as a seat heater, the sheet heater and a human body are brought into a close contact state. In this case, the sense of heating of the human body given by far-infrared ray becomes larger than those in the cases of Examples.

The black thermal fusion layer 4 showed the following characteristic: the amount of a heat ray component unsuitable for the heating of a human body out of exothermic energy was small, and the amount of a far-infrared ray component effective in heating the human body was large. It was revealed that the sheet heaters according to the embodiments each provided an energy-saving effect exhibited by far-infrared ray radiation.

<Evaluation on Seating Stress>

In Comparative Example 2 in which the surface of the aluminum-coated base material 3 was not protected with the black thermal fusion layer 4 or the thermal fusion layer 7, several portions in each of which the peeling of the aluminum thin film of the base material occurred, an aluminum fine piece scattered, and the cloth of the cotton fabric thereof was exposed were observed. In contrast, in each of Examples 1 to 5, the aluminum-coated base material 3 was coated with the black thermal fusion layer 4 or the thermal fusion layer 7, and hence no aluminum fine piece broke the coating layer to appear.

In addition, in each of Examples 1 to 5, after the test, although a crease occurred in the black thermal fusion layer 4 or the thermal fusion layer 7, the breakage of the black thermal fusion layer 4 or the thermal fusion layer 7 did not occur, and the scattering of a carbon-containing fine piece was not observed.

As described above, it was revealed that in the sheet heater in which the black thermal fusion layer 4 or the thermal fusion layer 7 was thermally fused to coat the aluminum-coated base material 3, an aluminum-coated thin film was sufficiently protected. That is, it was able to be recognized that the sheet heaters according to the embodiments were each able to provide high safety, <Evaluation on Charging Prevention>

The charging voltage measured in the sheet heater of Comparative Example 1, which did not include the aluminum-coated base material 3 and the black thermal fusion layer 4, was relatively high. In contrast, the charging voltage measured in each of the sheet heaters of Examples 1 to 5 was suppressed to ½ or less of that of Comparative Example 1. That is, it was made clear that the black thermal fusion layer 4 was an antistatic body.

Of Examples 1 to 5, Example 2 having a relatively high carbon concentration showed a low charging voltage. This is probably because in the sheet heater according to Example 2, charged static electricity was quickly consumed by the black thermal fusion layer 4 having a moderate resistance value.

When the sheet heaters of Examples 1 to 5 and the sheet heater of Comparative Example 2, which did not include the black thermal fusion layer 4, are compared to each other, the aluminum-coated base material 3 in Comparative Example 2 has a low resistance value, and is hence excellent as an electric circuit. However, it was revealed that the sheet heater of Comparative Example 2 which did not include the black thermal fusion layer 4, and was hence inferior to the sheet heaters of Examples 1 to 5 each including the black thermal fusion layer 4 in terms of the consumption of static electricity by a resistance.

As described above, it was made clear that the black thermal fusion layer 4 having a high resistance functioned as an antistatic body. It was revealed that the sheet heater including the black thermal fusion layer 4 was able to reduce various kinds of noise due to static electricity as compared to the case where the heater did not include the black thermal fusion layer 4.

As described above, the sheet heaters according to the embodiments each provide such effects as described below through the combined structure of the aluminum-coated base material 3 and the black thermal fusion layer 4. That is, in terms of a structure, the sheet heaters of the embodiments can each use the conventional cord-like heating element 5 whose reliability has been ensured. In addition, in terms of performance, each of the sheet heaters of the embodiments shows a high rate of temperature increase, is reduced in overshoot, has a function suitable for the heating of a human body by far-infrared ray radiation, is reduced in power consumption, is strong against a seating stress, has an antistatic function, has a high degree of freedom in design, is extremely excellent in cost-to-performance ratio, and is energy-saving.

The preferred embodiments of the present invention have been described above, but it should be appreciated that the present invention is not limited to the embodiments described above, and various modifications may be made within the scope of the present invention.

The invention claimed is:

1. A sheet heater comprising:

a heat-insulating base material;

a metal-coated base material arranged on the heat-insulating base material;

a cord heating element arranged on a side closer to the metal-coated base material with respect to the heat-insulating base material;

a black thermal fusion layer arranged adjacent to the cord heating element;

a first thermal fusion layer arranged between the metal-coated base material and the cord heating element; and a second thermal fusion layer arranged on an outer periphery of the cord heating element, wherein the black thermal fusion layer is arranged so as to coat the metal-coated base material and the cord heating element, and the metal-coated base material, the first thermal fusion layer, the cord heating element having arranged thereon the second thermal fusion layer, and the black thermal fusion layer are fixed to each other through thermal fusion.

2. The sheet heater according to claim 1, wherein the black thermal fusion layer is an antistatic body.

3. The sheet heater according to claim 1, wherein the metal-coated base material is a woven fabric or nonwoven fabric coated with aluminum on a surface thereof, or a woven fabric formed from an aluminum-coated long fiber.

4. The sheet heater according to claim 3, wherein the aluminum coat of the woven fabric or nonwoven fabric coated with aluminum on the surface thereof has a thickness of from 5 μm to 50 μm.

5. The sheet heater according to claim 1, wherein the heat-insulating base material and the metal-coated base material are integrally formed from a nonwoven fabric coated with a metal on a surface thereof.

6. A seat heater, comprising the sheet heater according to claim 1.

7. A sheet heater comprising:

a heat-insulating base material;

a metal-coated base material arranged on the heat-insulating base material;

a cord heating element arranged on a side closer to the metal-coated base material with respect to the heat-insulating base material; and a black thermal fusion layer arranged adjacent to the cord heating element, wherein the black thermal fusion layer contains carbon particles, a polyolefin resin, and an olefin-based copolymer, and wherein the black thermal fusion layer has a thickness of from 0.05 mm to 0.35 mm, and a surface resistance of from $10^5$ Ω/cm$^2$ to $10^{10}$ Ω/cm$^2$.

8. The sheet heater according to claim 7, wherein the polyolefin resin is a polyethylene resin, and the olefin-based copolymer is an ethylene-vinyl acetate copolymer.

9. The sheet heater according to claim 7, wherein the black thermal fusion layer is arranged between the metal-coated base material and the cord heating element.

10. The sheet heater according to claim 9, wherein the black thermal fusion layer is thermally fused to the metal-coated base material, and wherein the cord heating element arranged on the black thermal fusion layer is sewed to a cord heating element holding base material, the cord heating element base material including the heat-insulating base material, the metal-coated base material, and the black thermal fusion layer.

11. The sheet heater according to claim 9, further comprising a thermal fusion layer arranged on an outer periphery of the cord heating element, wherein the metal-coated base material, the black thermal fusion layer, and the cord heating element having arranged thereon the thermal fusion layer are fixed to each other through thermal fusion.

12. The sheet heater according to claim 7, wherein the black thermal fusion layer is an antistatic body.

13. The sheet heater according to claim 7, wherein the metal-coated base material is a woven fabric or nonwoven fabric coated with aluminum on a surface thereof, or a woven fabric formed from an aluminum-coated long fiber.

14. The sheet heater according to claim 13, wherein the aluminum coat of the woven fabric or nonwoven fabric coated with aluminum on the surface thereof has a thickness of from 5 μm to 50 μm.

15. The sheet heater according to claim 7, wherein the heat-insulating base material and the metal-coated base material are integrally formed from a nonwoven fabric coated with a metal on a surface thereof.

16. A sheet heater comprising:

a heat-insulating base material;

a metal-coated base material arranged on the heat-insulating base material;

a cord heating element arranged on a side closer to the metal-coated base material with respect to the heat-insulating base material; and wherein the black thermal fusion layer has a thickness of from 0.05 mm to 0.35 mm, and a surface resistance of from $10^5$ Ω/cm$^2$ to $10^{10}$ Ω/cm$^2$.

17. A seat heater, comprising the sheet heater according to claim 7.

* * * * *